United States Patent [19]

Schmidt

[11] Patent Number: 5,767,660

[45] Date of Patent: Jun. 16, 1998

[54] METHOD AND APPARATUS FOR CHARGING AND/OR CHARGE EXCHANGE BETWEEN A PLURALITY OF SERIES CONNECTED ENERGY STORAGE DEVICES

[75] Inventor: Heribert Schmidt, Emmendingen, Germany

[73] Assignee: Fraunhofer-Gesellschaft Zur Forderung der Angewandten Forschung e.V., Munich, Germany

[21] Appl. No.: 776,734

[22] PCT Filed: Jul. 21, 1995

[86] PCT No.: PCT/DE95/00975

§ 371 Date: Jan. 29, 1997

§ 102(e) Date: Jan. 29, 1997

[87] PCT Pub. No.: WO96/05643

PCT Pub. Date: Feb. 22, 1996

[30] Foreign Application Priority Data

Aug. 13, 1994 [DE] Germany .......................... 44 28 769.0

[51] Int. Cl.[6] .......................................................... H02J 7/04
[52] U.S. Cl. ................................................ 320/140; 320/119
[58] Field of Search ............................. 320/4, 6, 15, 17, 320/19, 21, 119, 139, 140

[56] References Cited

U.S. PATENT DOCUMENTS

| 4,331,911 | 5/1982 | Park ...................... 320/119 |
| 5,003,244 | 3/1991 | Davis, Jr. ................ 320/119 |
| 5,633,575 | 5/1997 | Gali ...................... 320/119 |
| 5,646,504 | 7/1997 | Feldstein ................ 320/140 |

FOREIGN PATENT DOCUMENTS

| 0 432 639 A2 | 6/1991 | European Pat. Off. |
| 3031931 C2 | 9/1984 | Germany . |
| 1065959 | 1/1984 | Russian Federation . |

OTHER PUBLICATIONS

Hung, Stephen T., "Entension of Battery Life via Charge Equalization Control," IEEE Transactions on Industrial Electrontics, vol. 4, No. 1, Feb. 1993, pp. 96–104, Apr. 30,1992.

Primary Examiner—Peter S. Wong
Assistant Examiner—Gregory J. Toatley, Jr.
Attorney, Agent, or Firm—Baker & Daniels

[57] ABSTRACT

A method of charging and/or transferring charge between a multiplicity of accumulators connected in series, the method includes connecting at least one electrical storage device in parallel to the accumulators on a cyclic basis. The electrical storage devices are made up of transformer elements which are charged by the accumulators. During charging operations, the at least one electrical storage device is switched, on a cyclic basis, as the secondary coil of a transformer, a powered coil wound on the same core acts as the primary coil. During charge-transfer operations, the at least one electrical storage device is switched, on a cyclic basis, as a transmission coil in which a voltage is induced from the whole battery of accumulators, or one or more individual accumulators.

9 Claims, 3 Drawing Sheets

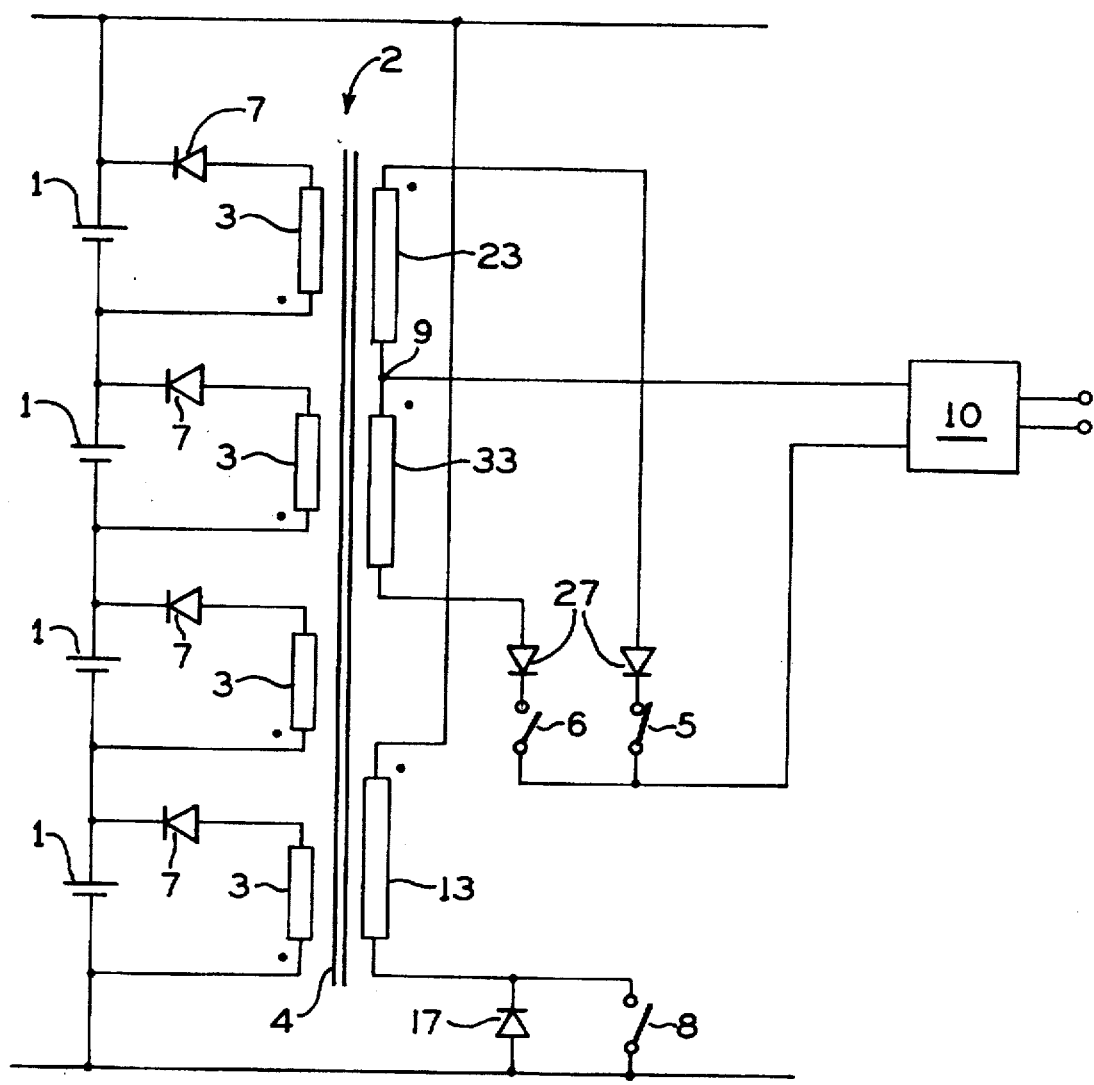
FIG_1

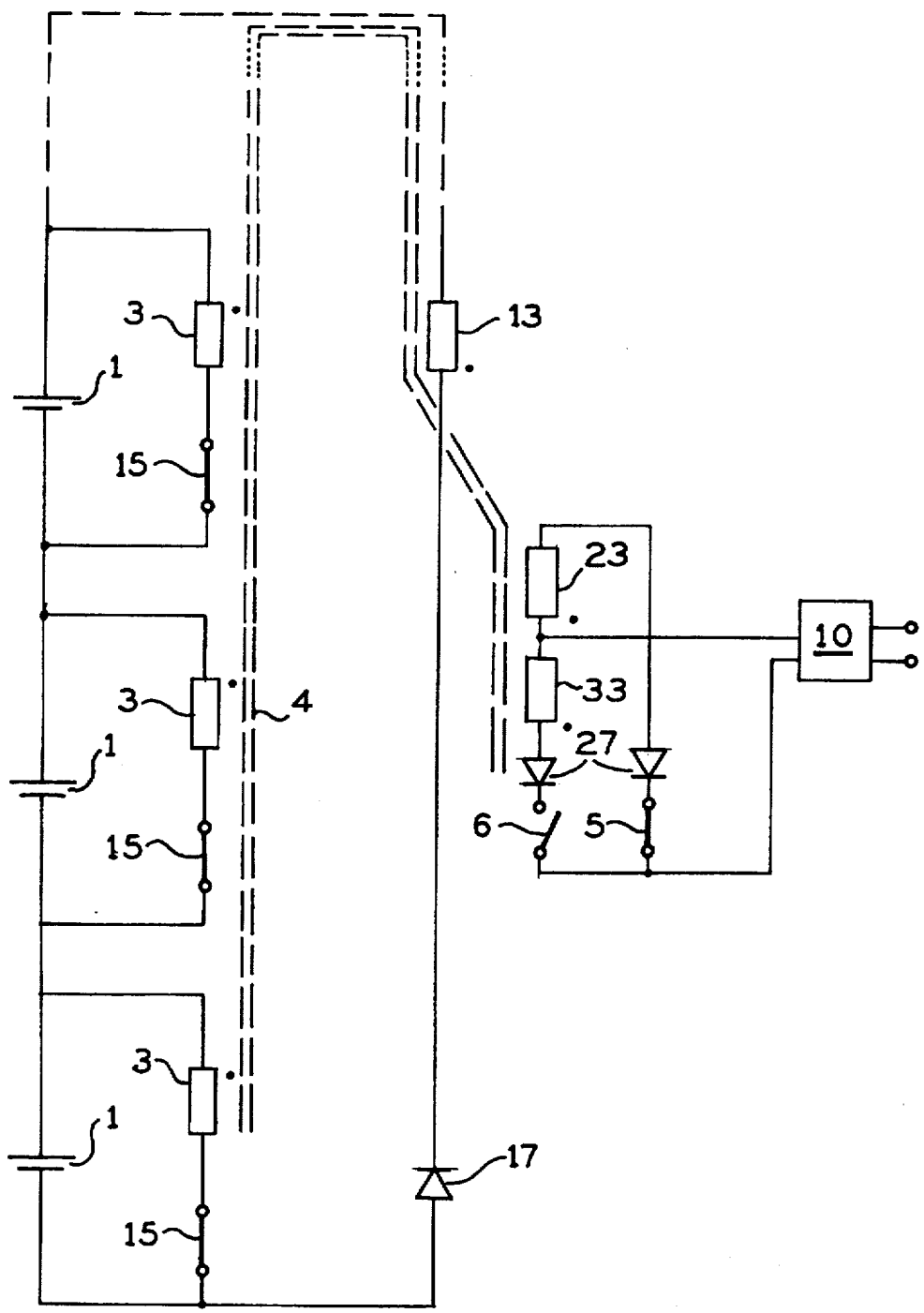
FIG_2

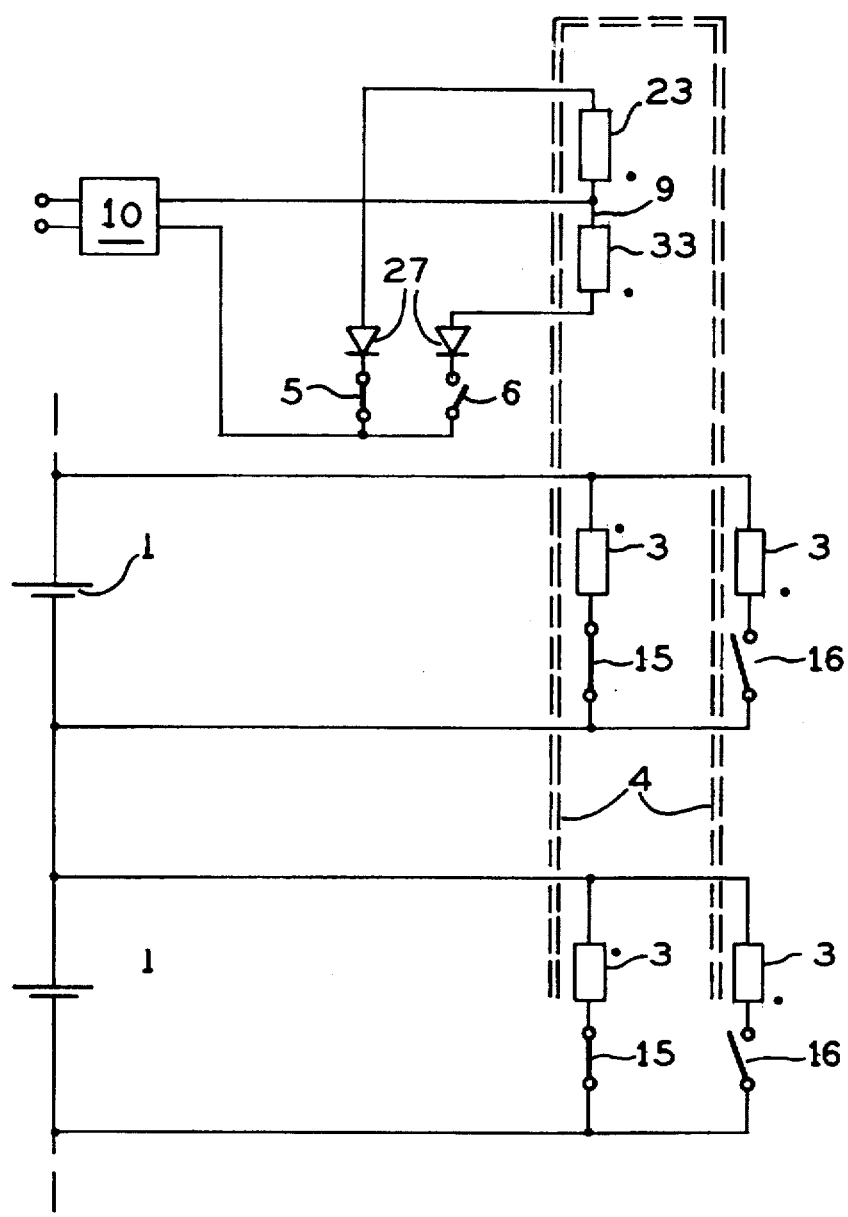
FIG_3

5,767,660

METHOD AND APPARATUS FOR CHARGING AND/OR CHARGE EXCHANGE BETWEEN A PLURALITY OF SERIES CONNECTED ENERGY STORAGE DEVICES

BACKGROUND OF THE INVENTION

The invention concerns a method for charging and/or charge exchange between a plurality of like energy storage devices connected in series where at least one electric storage device is, in timed fashion, connected in parallel to the energy storage devices, wherein each electric storage device is a transformer component charged from the energy storage devices, and concerns additionally an apparatus for the application of the method.

Such a monitoring method is known from U.S. Pat. No. -A-4 331 911 and serves the equalization of voltages of individual series-connected accumulators with a DC—DC converter. The sole central converter for all accumulators is charged from the overall battery and is unable to detect peculiarities of individual accumulators resulting from age-ing.

Until the deterioration of such an accumulator in its storing and charging quality is recognized by the monitoring device for accumulators, its malfunction leads to a chain of reactions in the group of the accumulators, which also results in a degradation of the other accumulators.

DE-PS 30 31 931 describes a device for extending the discharge time of rechargeable accumulators where the states of charge of the accumulators are detected with a monitoring device. A longer, reliable discharge of the accumulators is accomplished in that the accumulator operation is not terminated upon discharge of the weakest cell, and thus arrival at a limit voltage, but only when this limit voltage is reached at the average of all interconnected accumulators. A service life extension of accumulators in view of their replacement cannot be achieved thereby.

Known from SU 1 065 959 is a device for an accumulator charger that prevents overcharging and charging at inverted polarity of accumulators. The charging current is monitored by a transistor circuit which additionally comprises zener diodes. This safety circuit, however, can guarantee neither a monitoring of the quality of the accumulators nor bring about a longer service life of accumulators degrading in their quality.

Known from Applicant's EP 90 123 409 is a monitoring device for a plurality of series-wired like accumulators wherein with the aid of a control circuit an electric storage device is connected in parallel to one of the accumulators, wherein the primary winding of a transformer, in series with a breaker connected to the control circuit, is connected in parallel to the poles of the group of accumulators. The electric storage device is always formed of the secondary winding, which is always connected via a blocking diode to each accumulator. As a difference signal occurs in the control circuit, a function generator is, via a comparator, circuit turned on between the accumulators, the output of which generator is connected to the breaker. This makes it possible to supply energy to exactly the weakest accumulator. For small applications, this system has the disadvantage of a plurality of control components representing a cost factor and, as the case may be, a space and weight factor. Besides the appreciable expense for selecting the respective weak or strong cell, the performance range of the blocking converters used is upwardly limited.

All of these devices have the drawback that charging the energy storage devices, which may be, e.g., battery banks of an electric vehicle, requires an external charger which, in turn, occupies space in such a vehicle and represents additional weight.

SUMMARY OF THE INVENTION

In view of this prior art, the objective underlying the invention is to provide a method of the initially mentioned type wherein, besides delaying the replacement of an accumulator degraded in its quality at low wiring expense, the charging of the energy storage devices can also be effected.

This objective is inventionally met for a method in that the at least one electric storage device is switched in the charging operation, in one timing step, as secondary winding, with a feeder winding arranged on the same core being provided as primary winding, and in that the at least one electric storage device is, in the charge exchange operation, switched, in one timing step, as transfer winding into which a voltage is induced from the overall energy storage device or from one or several individual energy storage devices.

This objective is inventionally met for an apparatus in that the at least one electric storage device is in the charging operation switched, in one timing step, as secondary winding, with a feeder winding arranged on the same core being provided as primary winding, and in that the at least one electric storage device is, in the charge exchange operation, switched, in one timing step, as transfer winding in which a voltage is induced from the overall energy storage device or from one or several individual energy storage devices.

BRIEF DESCRIPTION OF THE DRAWINGS

The following illustrates with the aid of the drawing in greater detail several exemplary embodiments of the invention, the drawings showing in FIG. 1, a schematic wiring diagram of an apparatus for charging and charge equalization in four accumulators according to a first exemplary embodiment;

FIG. 2, a schematic wiring diagram of a further apparatus for charging and charge equalization in three accumulators according to a second exemplary embodiment; and FIG. 3, a schematic wiring diagram of a further apparatus for charging and charge equalization in two accumulators according to a third exemplary embodiment.

BRIEF DESCRIPTION OF THE PREFERRED EMBODIMENTS

Many realization options for circuits for the application of the method are possible, of which several are illustrated hereafter. The apparatus allows integration, e.g., in a device for charge exchange according to EP 90 123 409, of the applicant. Moreover, it may be employed also in DE (application number of ISE-P55, Az-PST; 93/30586) for forming with a small number of additional components a combined apparatus for charge exchange and charging.

FIG. 1 shows a wiring diagram of an apparatus for charging and charge exchange for four accumulators 1 according to a first embodiment. These accumulators can form a single group of four accumulators 1 or may be parts of a larger battery bank comprising, e.g., 10 to 12 accumulators.

A transformer 2 is provided that has four identical windings 3, all of which are arranged on a common core 4 in close magnetic coupling in the same directional sense indicated by the dots. One winding 3, forming an energy storage device is always associated with an accumulator 1, with each winding 3 arrayed in series with a diode 7 and wired in parallel with the accumulator 1.

Also provided is a supplemental winding 13 with a winding sense opposite to the windings 3 the supplemental winding is arrayed, in series with a parallel combination of a switch 8 and a diode 17, for being switched to the overall battery bank.

Also provided on the core 4 are two additional feeder windings 23 and 33 of same winding sense windings 23 and 33 are connected via a center rap 9 to the positive-voltage source output of a power rectifier 10. The other ends of the feeder windings 23 and 33, each in series with a diode 27 and switches 5 and 6, respectively, are connected to the negative-voltage source output of the power rectifier 10. The power rectifier 10 is energized, e.g., from the usual A/C source 11 and generates on the secondary side an intermediate-circuit voltage.

In the charging phase, the windings 23 and 33 are now connected with the aid of the switches 5 and 6 alternately to the poles of the power rectifier 10 at a pulse duty factor of less than 50%. The switches 5 and 6 are illustrated in the timing step in which the switch 5 is closed, so that the winding 23 is acted upon by the intermediate-circuit voltage generated by the power rectifier 10. In the next, not illustrated, timing step, switch 6 closes, whereas switch 5 opens, so that the winding 33 is acted upon by the intermediate-circuit voltage.

As illustrated in FIG. 1, the switch 8 is open at that time. Hence, the device operates as a rectifier. During the closing phase of switch 5, the feeder winding 23 induces in the windings 3 a voltage to the effect that the diodes 7 become conductive and a current flows directly to the accumulators 1. The larger portion of the current flows to the accumulator cell with the lowest voltage, so that in conjunction with charging a direct equalization of charged voltages occurs during the charging operation.

During the closing phase of switch 6, the feeder winding 33 induces a voltage in the winding 13, making the diode 17 conductive and causing a current to flow into the overall battery.

The switches 5 and 6 are each connected to appropriate outputs of a clock generator, which is not illustrated in the drawing and is able to generate a clock frequency of preferably more than 20 kHz.

Charging occurs in two timed steps, once with the switch 6 closed for charging the overall battery, while with the switch 5 closed each individual accumulator 1 is charged via the windings 3. With the said windings dimensioned accordingly, about one-half of the energy is fed directly into the overall battery while the other half flows via the windings 3 and the diodes 7 into the individual accumulators 1.

Owing to the close magnetic coupling, the same voltage is induced in all windings 3, notably in the four windings 3 shown here. If one accumulator 1 now carries a lower voltage, due to ageing or other effects, an appropriate current flows directly to the this cell.

Once the charging operation is completed, the switches 5 and 6 are opened and the power rectifier 10 is disconnected from the power source. Thereafter, the device is operated as a blocking oscillator with the aid of a sequence control. In this context, an activating circuit is provided which can be tripped by a plurality of events, depending on the purpose of application As an example a simple on/off switch may be used, e.g., by the equivalent of an ignition lock of a battery-powered vehicle.

The circuit may also feature a voltage comparator that transmits a switching pulse to the output of the circuit when the absolute value of the battery voltage ranges within, or better without, predetermined values. With a lead accumulator 1, for example, these values could range at a voltage of greater than 2.2 volts or smaller than 1.95 volts. A voltage of an accumulator 1 outside these values allows inferring a charging or discharging operation at which the charge equalization should take place.

Also provided could be a detector for determining a dynamics of the battery voltage pointing to quick load changes, such as occur in the operation of an electric vehicle. Furthermore, the deviation of the voltage of individual accumulators 1 from a momentary mean of the overall system could be provided as a trigger for the activating circuit. Lastly, the circuit for charge equalization may start also, e.g., periodically, for example, every 3 hours.

When the activating circuit generates a start pulse in accordance with one of the above conditions, which can be checked individually but also grouped, said pulse activates, e.g., a monoflop that turns on the device for charge equalization for a predetermined time, for instance for one-half hour, this time period may also be set by a characteristic of the activated load. The device is monitored by a logic unit to which further signals for detection of an excess current or excess temperature of components, such as transistors and windings. This circuit may also possess an output for display of status signals or control signals, for example, for load dumping This control logic activates the said clock generator of high clock frequency, to the output of which the control input of the switch 8 is connected.

In operation of the device for charge equalization, the switch 8 opens and closes at a high clock frequency of several kHz, whereby energy is withdrawn from the overall battery and is passed to the weakest individual cell.

FIG. 2 shows a wiring diagram of a further device for charging and charge equalization with three accumulators 1 according to a second exemplary embodiment. Identical features are referenced identically in all of the figures.

In this circuit, the control signal of the clock generator, with the aid of which the switches 5 and 6 are closed alternately in the two timing steps, acts upon further switches 15 that are each wired in series with the windings 3. These switches 15 are also closed in the timing step in which the switch 5 is closed, and they switch the windings 3 is parallel with the accumulators 1. This allows the energy delivered by the power rectifier 10 to be induced via the feeder winding 23 in the windings 3, which output a charging current for the individual accumulators 1.

With the switch 6 closed, in contrast, the clock generator opens the switches 15 and causes a voltage to be induced in the winding 13 via the feeder winding 33, thereby charging the overall battery.

The device according to FIG. 2 therefore operates as a circuit for charge equalization, when both switches 5 and 6 are open and the switches are only opened and closed with the aid of the same or of a further clock generator.

All of the windings 3 are switched to the accumulators 1 in the same direction, while for the second timing period with open switches 15 there is provided the demagnetizing winding 13, which acts jointly for all accumulators 1 and is switched via a diode 17 via the overall battery. The actual charge exchange occurs in the cut-in phase within the first timing period. With a suitable selection of the windings 3 and 13, this timing period can also amount to over 50% of a cycle, since the demagnetization can occur swiftly.

FIG. 3 shows a wiring diagram of a further device for charge equalization with two accumulators 1 illustrated in this section, according to a third exemplary embodiment. Illustrated are two series-wired accumulators 1 which are part of a battery bank comprising a plurality of accumulators. Two windings 3 of different winding sense are coordinated with each of the accumulators 1. These windings 3, each with a different winding sense as regards their switching to the accumulator 1, are series-wired each with a switch 15 or 16. The windings 3 are arranged on a common core 4.

Due to the successive closing of the switches 15 and 16, respectively, at a pulse duty factor of, e.g., somewhat less than 50%, each of the two windings 3 assigned to an accumulator 1 is connected in parallel with the accumulator 1, with all of the accumulators being virtually switched in parallel, so that a charge exchange occurs in each step and a current flows into the weakest accumulator 1.

Moreover, the device possesses the feeder windings 23 and 33 on the common core 4, connected to the power rectifier 10 in a manner analogous to the other exemplary embodiments. In a charging operation, the switches 5 and 15, respectively 6 and 16, are now jointly closed or opened. Switches 5 and 15 or switches 6 and 16 are always operated in synchronism. Hence, a voltage is induced in the windings 3 via the feeder winding 23 while the switch 5 is closed, which windings 3 are wired in parallel with the accumulators 1 via the switches 15.

I claim:

1. A method for charging of and for charge exchange between a plurality of series connected energy storage devices, said method comprising:
   periodically connecting an electrical storage device in parallel to said plurality of energy storage devices for charging said energy storage devices, said electrical storage device comprising a secondary transformer winding which is wound on a common core with a primary feeder winding; and
   periodically connecting said electrical storage device so as to cause an exchange of charge between said plurality of energy storage devices.

2. Method according to claim 1, wherein at least one electric storage device is associated with each energy storage device.

3. Method according to claim 1, wherein said charging step comprises alternately individually charging a separate energy storage device of said plurality of energy storage devices and charging said plurality of energy storage devices collectively.

4. Method according to claim 1, wherein said charging step comprises switching individually a separate energy storage device of said plurality of energy storage devices between two different transformer windings.

5. An apparatus for charging of and charge exchange between a plurality of series connected energy storage devices which form an overall energy storage device;
   said apparatus comprising:
   a clock for generating alternating first and second clock periods;
   a switch which is periodically actuated by said clock, said switch connected in parallel to said overall energy storage device;
   a magnetic core;
   a first transformer winding wound on said magnetic core;
   a plurality of second transformer windings wound on said magnetic core and respectively connected in parallel to each said energy storage device, said second transformer winding functioning as a secondary winding in alternate first periods of said clock with respect to said first transformer windings, whereby said plurality of energy storage devices are electrically charged; and
   said second winding operating as transfer windings in said second clock periods, whereby said energy storage devices are enabled to exchange charges.

6. Apparatus according to claim 5, wherein a transformer winding is associated with each said energy storage device.

7. Apparatus according to claim 5, wherein said switch comprises an electrical switch and a diode.

8. Apparatus according to claim 5, wherein said second transformer windings comprise two windings which can be individually converted to an energy storage device, said first transformer winding comprising two windings for respectively energizing said two second transformer windings.

9. Apparatus according to claim 5, including a sequence control circuit which is activatable for one of a predeterminable period of time and a period of time determined by a connected load, said sequence control circuit connected to said clock.

* * * * *